United States Patent [19]

Vatcher

[11] Patent Number: 5,415,713
[45] Date of Patent: May 16, 1995

[54] SEALING A CONNECTOR AGAINST WATER INGRESS

[75] Inventor: David Vatcher, Swindon, England

[73] Assignee: Raychem Limited, United Kingdom

[21] Appl. No.: 142,437

[22] PCT Filed: May 29, 1992

[86] PCT No.: PCT/GB92/00969

§ 371 Date: Feb. 28, 1994

§ 102(e) Date: Feb. 28, 1994

[87] PCT Pub. No.: WO92/21510

PCT Pub. Date: Dec. 10, 1992

[30] Foreign Application Priority Data

May 29, 1991 [GB] United Kingdom ............... 9111551
May 31, 1991 [GB] United Kingdom ............... 9111780

[51] Int. Cl.$^6$ ................. H01B 7/28; H01B 13/32; H01R 4/22; H01R 4/72
[52] U.S. Cl. ........................... 156/48; 156/49; 156/52; 156/86; 428/34.9; 439/730
[58] Field of Search ............ 156/47, 49, 51, 52, 156/53, 84, 86; 428/34.9; 29/447; 439/730

[56] References Cited

U.S. PATENT DOCUMENTS

| | | | |
|---|---|---|---|
| 3,781,461 | 12/1973 | Thompson et al. | 174/93 |
| 3,891,790 | 6/1975 | Kierstead | 174/93 |
| 4,018,962 | 4/1977 | Pedlow | 428/245 |
| 4,701,574 | 10/1987 | Shimirak et al. | 174/93 |
| 4,962,286 | 10/1990 | Jensen et al. | 156/49 X |

FOREIGN PATENT DOCUMENTS

| | | |
|---|---|---|
| 671776 | 3/1966 | Belgium . |
| 1561821 | 3/1969 | France . |
| 2032252 | 11/1970 | France . |
| WO88/00603 | 1/1988 | WIPO ............ C08L 53/02 |

Primary Examiner—Michael W. Ball
Assistant Examiner—Francis J. Lorin
Attorney, Agent, or Firm—Sheri M. Novack; Herbert G. Burkard

[57] ABSTRACT

A method of sealing a connector (2) in an electrical cable (1) for example a submarine cable comprises:

(i) applying a quantity of gel (6) onto the connector and encapsulate at least part of it;

(ii) positioning an inner hollow dimensionally recoverable article (9), for example in the form of a cap, about the connector and gel and recovering it thereon to enclose the gel and at least part of the connector, the recovery causing part (12) of the gel to exude out of the open end of the article; and (iii) positioning an outer hollow open-ended dimensionally recoverable article (13) over the connector (2) and recovering it so that it encloses at least the end of the inner article (9) and the part (12) of the gel (6) that has exuded therefrom.

This method can enable an effective seal against moisture ingress to be made while at the same time being relatively easy to remove for re-entry without damaging the connector.

6 Claims, 1 Drawing Sheet

SEALING A CONNECTOR AGAINST WATER INGRESS

This invention relates to the sealing of electrical and mechanical connectors, against water ingress, for example in an in-line splice or cable termination in an electrical cable or an interconnection in an air or hydraulic pipe.

BACKGROUND OF THE INVENTION

Corrosion protection of such connectors and protection of the electrical lines in the connectors is often required when they are employed in wet environments, for example in humid conditions or in underwater applications. Such forms of connector are often provided with seals, for example in the form of "O" rings, against moisture ingress, but such seals often do not function effectively due to the tolerances in the parts and/or mechanical loading of the connectors, and additional sealing of the connector is necessary. We have found, however, that the use of adhesives or mastics in the sealing of the connectors makes it very difficult to re-enter the connector and can often cause damage to the connector during removal.

SUMMARY OF THE INVENTION

According to the present invention, there is provided a method of sealing a connector in a cable or pipe against water ingress, which comprises:
 (i) applying a quantity of a gel material onto the connector to encapsulate at least part of it;
 (ii) positioning an inner hollow dimensionally recoverable article having at least one open end about the connector and gel material and recovering it thereon to enclose the gel material and at least part of the connector, the recovery causing part of the gel material to exude out of the or each open end of the article; and
 (iii) positioning an outer hollow dimensionally recoverable article having at least one open end over the connector and recovering it so that it encloses at least the or each end of the inner article and the part of the gel material that has exuded therefrom.

The method according to the invention has the advantage that it can enable an effective seal against moisture ingress due to humidity or to underwater hydrostatic pressure to be formed, while at the same time being relatively easy to remove for re-entry to the connector without damage to the connector.

The term "gel" or "gel material" as used herein is intended to mean a liquid-extended polymer composition. Such compositions normally contain a three-dimensional network of cross-linked molecular chains and preferably include at least 300 parts, more preferably at least 500 parts by weight of extender liquid per 100 parts by weight of the polymer composition. The gel used in the invention preferably has a cone penetration value (measured by ASTM D217) within the range of from 100 to 400 $10^{-1}$ millimeters, more preferably 100 to 350 $10^{-1}$ millimeters; an ultimate elongation (measured by ASTM D412) preferably greater than 100%, with substantially elastic deformation to an elongation of preferably at least 100%; and ultimate tensile strength (ASTM D412) preferably less than 1 MegaPascal.

The polymer composition may for example comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers, or styrene-ethylene-butylene-styrene triblock copolymers as disclosed in international patent publication number WO88/00603. The extender liquids employed in the gel preferably comprise oils conventionally used to extend elastomeric materials. The oils may be hydrocarbon oils, for example paraffinic or naphthenic oils, synthetic oils for example polybutene or polypropene oils, and mixtures thereof. The preferred oils are mixtures of non-aromatic paraffins and naphthenic hydrocarbon oils. Suitable gels can also be prepared by curing reactive silicones with non-reactive extender silicones. The gel may contain known additives such as moisture scavengers (eg. benzoyl chloride), antioxidants, pigments and fungicides.

The gel is resiliently deformable, and when compressed is capable of flowing and conforming around intricate shapes and adhering to solid surfaces. The gel is also capable of being pierced by sharp objects (such as elongate electrical conductors for example) and when so pierced tends to conform to the piercing object. These properties are exploited in this invention to produce a moisture seal.

In the broadest aspect of the invention the dimensionally recoverable articles can be ones that can be caused to recover when subjected to the appropriate operation. Preferably the articles are dimensionally heat-recoverable.

A heat-recoverable article is an article the dimensional configuration of which may be made substantially to change when subjected to heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962 and 3,086,242. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Patent 1,440,524, an elastomeric member such as an outer tubular member is held in a stretched state by a second member, such as an inner tubular member, which, upon heating weakens and thus allows the elastomeric member to recover.

The inner and/or outer dimensionally recoverable article may have any appropriate form. For example, in cases where a connector is terminated the inner and/or outer recoverable article may be in the form of a cap having a single open end for receiving the connector. If only one article is in the form of a cap the other may be in the form of an open-ended tube or sleeve. Where the connector is connected to another connector to form an in-line splice in the cable or pipe, the articles will be generally tubular having two open ends. In addition it is possible for a tube or sleeve having two open ends to be in the form of a wraparound article, that is to say, in an open configuration and having a pair of opposed edges that can be brought together and retained together to form a hollow open-ended tube or sleeve. Such articles have the advantage that they can be installed on pipes or cables in which there is no access to a free end of the pipe or cable. One example of a wraparound article is described in U.S. Pat. No. 3,455,336, the disclosure of which is incorporated herein by reference. Either the inner or outer article or both may be formed as a wraparound article provided that any inner article so formed has an external profile that enables the outer article to be recovered thereon and a seal to be formed therebetween. It is even possible that the articles could be formed by wrapping lengths of longitudinally recoverable tape around the connectors.

It may be advantageous in certain instances for other materials to be employed in addition to the gel. For example a mastic barrier may be located adjacent to the gel material.

Two methods according to the invention will now be described by way of example with reference to the accompanying drawings in which:

DETAILED DESCRIPTION OF THE PREFERRED EMBODIMENTS

Figure 1:
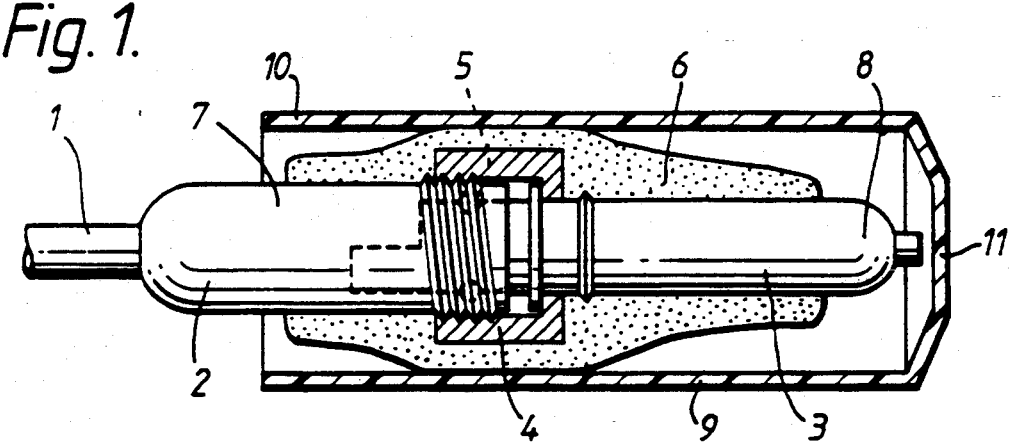
FIG. 1 is a sectional elevation along the axis of a connector that is encapsulated by a gel during the process according to the invention.

Referring to the accompanying drawings a termination in a submarine cable I having a connector 2 having a tough plastics housing is provided by a termination piece 3 that is secured to the connector 2 by means of a threaded coupling ring or nut 4. The connector 2 is provided with an "O" ring 5 in order to prevent moisture ingress into the interior of the connector.

In order to provide additional sealing against water ingress the assembly is degreased with a solvent and a quantity of a gel 6 is applied to the exterior of the connector. The gel is preferably in the form of a length of tape that is unwound from a roll and wrapped around the connector 2, termination piece 3 and nut 4 along their length with the exception of a region 7 at the end of the connector 2 that joins the cable and a region 8 at the opposite end of the termination piece 3, the coated region of the connector and termination assembly is thus effectively cocooned in a block of gel.

Figure 2:
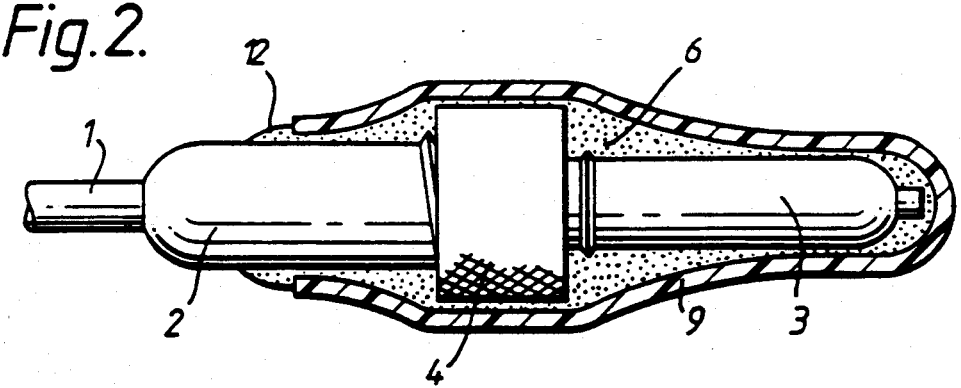
FIG. 2 is a sectional elevation of the connector shown in FIG. 1 with an internal heat-shrinkable article recovered thereon.
Figure 3:
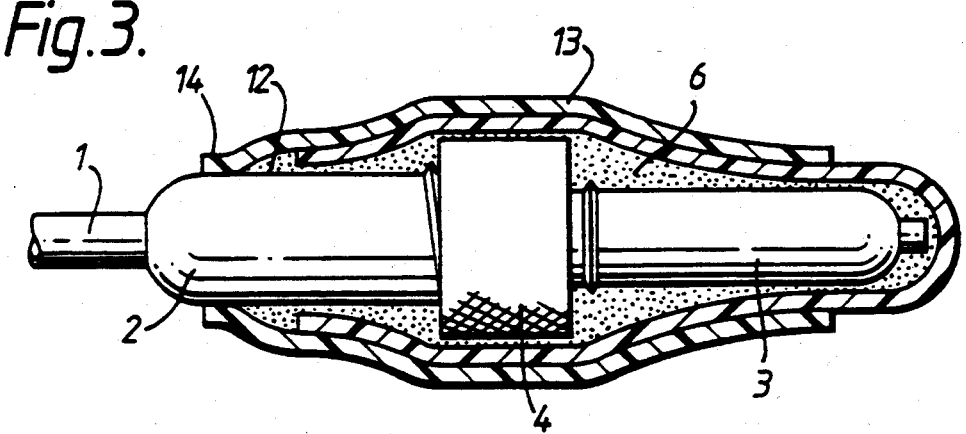
FIG. 3 is a sectional elevation of a completed arrangement according to the invention.

A heat-shrinkable cap 9 is placed over the assembly so that its open end 10 extends along the connector 2 beyond the end of the gel 6, and is then recovered by means of a gas torch or a hot-air gun. The cap 9 is recovered first at its closed end 11 in order to prevent significant quantities of air being trapped inside the cap, and also to cause that end of the cap to grip the termination piece so that it will not "milk off" the connector assembly when the remaining parts of the cap are heated, that is to say, so that radical recovery of the cap will not cause it to slide off the assembly with the underlying gel acting as a lubricant. The compressive forces caused by recovery of the cap 9 forces the gel 6 into the voids and recesses of the connector assembly and over the end region 8 of the termination piece. As the cap recovers part 12 of the gel will exude out of the open end 10 of the cap for a short distance, typically 10 to 15 mm, along the connector 2 as shown in FIG. 2.

A second heat-shrinkable article which may also be in the form of a cap is preferably in the form of a tube or sleeve 13 having two open ends is positioned over the assembly so that one end 14 portion thereof extends over and beyond the part 12 of the gel that has exuded from the end of the cap 9. The tube 13 is then recovered onto the assembly so that is encloses the exposed part 12 of the gel. The tube 13 thereby protects the otherwise exposed gel but more importantly puts the gel into compression causing it to form a seal on the cap 9. The connector assembly is thus protected by a primary and a secondary gel seal against water ingress.

The sealing assembly is easy to remove, simply requiring a sharp knife or other implement to slit the recovered articles open so that the articles can be removed together with the gel.

Figure 4:
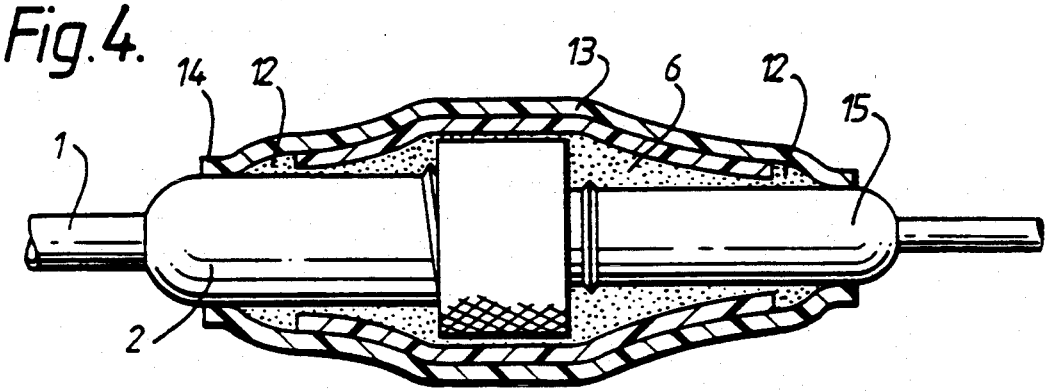
FIG. 4 is a sectional elevation of a completed in-line splice according to the invention.

An alternative form of arrangement is shown in FIG. 4 in which an in-line connection between a pair of connectors 2 and 15 has been sealed against moisture ingress according to the invention. In this arrangement the cap 9 has been replaced by a length of heat-shrinkable tubing 15 that has two open ends from each of which a portion 12 of the gel has exuded on recovery of the tube. The length of the outer heat-recoverable tube 13 is such that it will extend a few centimeters beyond each end of the inner tubing 15 and so enclose the gel 12 that has exuded from both ends thereof.

I claim:

1. A method of sealing a connector in a cable or a pipe against water ingress, which comprises:
   (i) applying a quantity of gel material onto the connector to encapsulate at least part of it;
   (ii) positioning an inner hollow dimensionally recoverable article having at least one open end about the connector and gel material and recovering it thereon to enclose the gel material and at least part of the connector, the recovery causing part of the gel material to exude out of the or each open end of the inner article; and
   (iii) positioning an outer hollow dimensionally recoverable article having at least one open end over the connector and recovering it so that it encloses at least the or each end of the inner article and the part of the gel material that has exuded therefrom.

2. A method as claimed in claim 1, wherein the gel material is applied onto a part only of the connector and the inner article is first recovered to grip a part of the connector not carry the gel material.

3. A method as claimed in claim 1, wherein the gel is in the form of a tape and is wrapped around the connector.

4. A method as claimed in claim 1, wherein the connector is part of a cable termination and the inner article is in the form of a cap.

5. A method as claimed in claim 1, wherein the connector forms part of a cable splice together with a further connector, and the inner article is in the form of a sleeve having two open ends.

6. An electrical or mechanical connector that has been sealed against water ingress by a method as claimed in claim 1.

* * * * *